(No Model.)

J. B. JOHNSON.
Machine for Molding Soles for Boots and Shoes.
No. 241,221. Patented May 10, 1881.

Witnesses
S. N. Piper

Inventor.
Joseph B. Johnson.
by R. H. Eddy atty.

UNITED STATES PATENT OFFICE.

JOSEPH B. JOHNSON, OF LYNN, MASSACHUSETTS.

MACHINE FOR MOLDING SOLES FOR BOOTS AND SHOES.

SPECIFICATION forming part of Letters Patent No. 241,221, dated May 10, 1881.

Application filed February 14, 1881. (No model.)

*To all whom it may concern:*

Be it known that I, JOSEPH B. JOHNSON, of Lynn, of the county of Essex and State of Massachusetts, have invented a new and useful or Improved Machine for Molding Soles for Boots or Shoes; and I do hereby declare the same to be described in the following specification, and represented in the accompanying drawings, of which—

Figure 1:
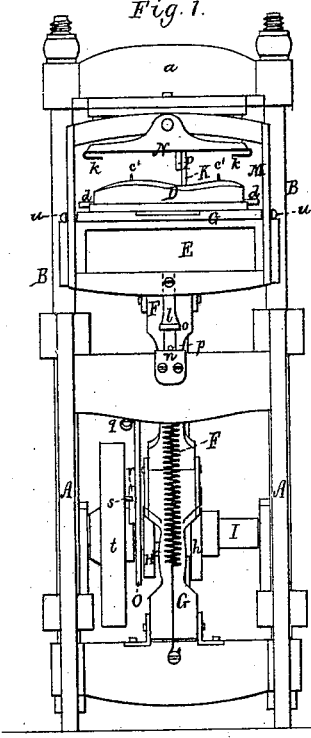
Figure 2:
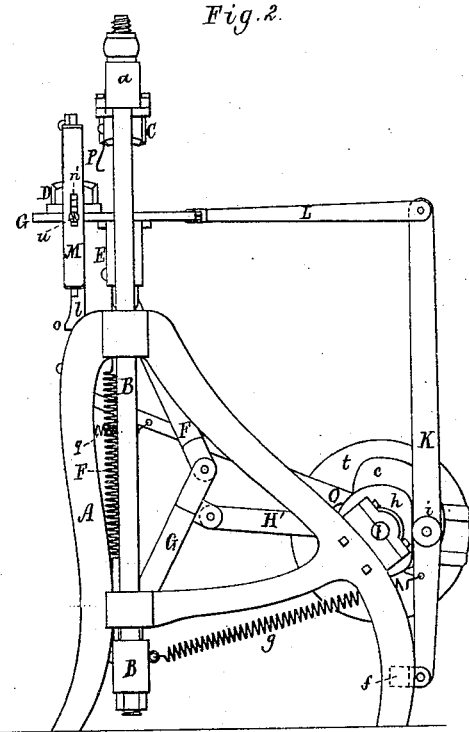
Figure 4:
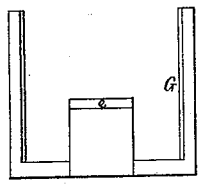
Figure 5:
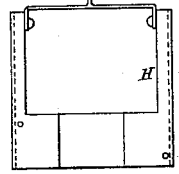
Figures 3, 6:
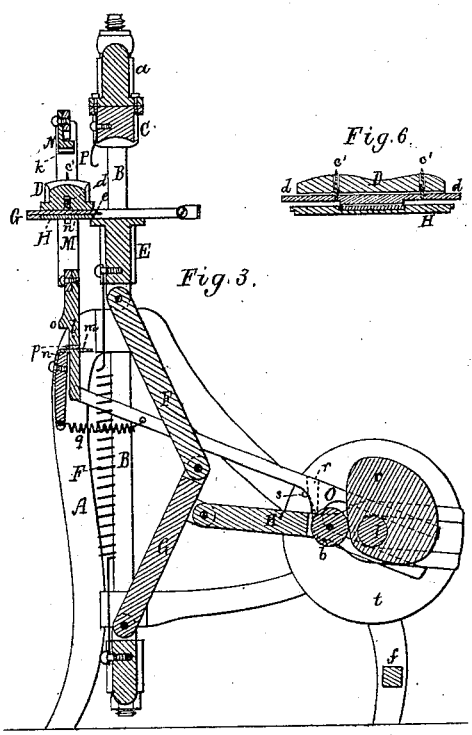

Figure 1 is a front-end view, Fig. 2 a side elevation, and Fig. 3 a longitudinal section, of a machine embodying my invention. Figs. 4, 5, and 6 are hereinafter described.

In this machine there is, besides mechanism for molding soles, not only mechanism for receiving each of them and pressing it upon movable pivots, but mechanism for transferring the sole, with such movable points, between the molding-dies C and D.

In sole-molding machines wherein each sole preparatory to being molded has, by the hand of an attendant, to be laid on one of the dies and afterward to be so removed therefrom, serious injury to the attendant has frequently happened by reason of his fingers becoming caught and crushed between the dies.

One object of my invention is to prevent such accidents; and for this purpose I have in the machine a device for receiving and holding each sole preparatory to its transfer to the lower die, and besides this I have applied to the die movable points or spurs to aid in holding the sole to the die, while such sole may be in the act of being moved, with such die, directly to and underneath the fellow die; and, furthermore, I have in the sole-receiver mechanism for dropping it or forcing it with the sole downward, so as to cause the points to enter the sole, and the latter to be deposited on the die; furthermore, I have in the machine a sole-discharger, and to the points mechanism for effecting their depression within the die in order to allow the clearer or sole-discharger, when the die may next be moved forward, to separate the molded sole from it for it to drop out of the machine.

In the drawings, A denotes the frame of the machine, it having within it a vertically-movable frame, B, to whose upper cross-head, *a*, the female or concave sole-molding die C is fixed. Within the frame B, and adapted thereto to slide vertically and rectilinearly, is a cross-head, E, to which the upper of a pair of toggles, F G, is jointed, the lower of such toggles being jointed to the lower cross-head of the frame B.

A furcated pitman, H', spanning the driving-shaft I, is jointed to the lower toggle, and carries a friction-roller, *b*, that bears against the periphery of a cam, *c*, fixed on the said shaft. The cam in part of its revolution will move the toggles forward, so as to cause them to force the cross-head E upward, its weight or the retractive power of a spring, F, being employed to effect a counter movement of the said cross-head. Fixed on such cross-head is a frame, G, shaped in top view as shown in Fig. 4, and arranged as represented in Figs. 1, 2, and 3. Within this frame there is placed, and to slide rectilinearly, a carrier, H, that supports the lower or male die, D, such carrier being shaped as shown in top view in Fig. 5.

Fig. 6 is a vertical section of the die-carrier H, the die D, and the points and their carrying-bar, such section being taken lengthwise of the die. The points shown at *c' c'* extend upward from a horizontal bar or carrier, *d*, and with it are adapted to the die, so as to be capable of moving vertically relatively thereto. There is to the frame G an inclined plane, *e*, which, arranged as shown, causes the bar *d* to be forced upward during a forward horizontal movement of the movable die, such being to cause the points to protrude from the said die, in order that a sole may be deposited on it and them at the proper time. While the die-carrier may be moved backward, the bar carrying the points will, by its weight, descend the inclined plane, so as to draw the points wholly down within the die, in order that a molded sole, during advance of the carrier, may be cast off the die by a clearer, P, projecting downward from the upper die, in manner as shown.

The carrier H, by a rod, L, is connected with a lever, K, hinged at its lower end to a cross-bar, *f*, of the frame A, the rod being properly jointed to the said carrier and lever. A spring, *g*, fixed to the frame B and to the lever K, and arranged as shown, serves to draw the lever forward and to keep against a cam, *h*, a friction-roller, *i*, applied to the lever. The cam fixed to the driving-shaft I is to produce a rearward vibratory movement of the lever and the carrier H, the spring $g$ producing a counter-movement of the said parts.

Figure 7:
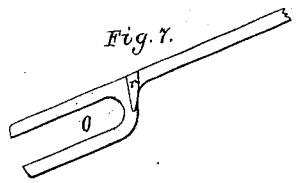

Encompassing the frame G, in manner as shown, and adapted to it, so as to be capable of sliding vertically relatively to it, is the carrier M of the sole-receiver N, such receiver being a bar having hooks $k\,k$, arranged as represented. The carrier M has a leg, $l$, extending down from it through a slot, $m$, in a stationary plate or bracket, $n$. The said leg has two shoulders or steps, $o\ p$, arranged on it, as represented, and said leg is jointed to the shank of a fork, O, that spans the driving-shaft I. A spring, $q$, applied to the fork and to the frame A, serves to draw the said fork forward. To one side of the fork there is a cam, $r$. (See Fig. 7, which is a view of the fork.) A stud, $s$, extending from the inner side of the driving-pulley $t$ of the shaft I, co-operates with the said cam in each revolution of the pulley, in order to effect a rearward movement of the fork and the leg of the carrier M. This carrier has in each of its vertical or side bars a slot, $n'$, to receive a stud, $u$, extending from the frame G.

During each rise of the lower die the sole-receiver will be carried upward with such die, and while a sole is being molded the attendant should place a blank sole within the receiver or upon its hook, the heel part of such blank sole being made to rest on one and the toe part on the other of the said two hooks. The die, while being depressed, is also moved forward directly underneath the sole-receiver, the forward movement of the die causing the molded sole on it to be carried against the clearer P, and by such to be forced off the die, so as to be discharged from the machine. While the die is being depressed and moved forward the sole-receiver will be held upward by its lower step, $p$, which then will be resting on the bracket $n$, it being drawn forward on the bracket by the spring $q$. On the die passing forward underneath the sole-receiver the points will be forced upward, so as to project somewhat above the die. Immediately on the die having attained its position underneath the sole-receiver, which is to be supposed to be provided with a sole-blank, the leg of the carrier of the said receiver will be retracted, so as to draw the step $p$ off the bracket. On this taking place the carrier and the sole-receiver will simultaneously drop, so as to deposit the sole-blank on the die and its points, and cause the latter to enter the blank. On the die being next retracted the blank will, by the points, be drawn out of the receiver. While the bar $d$, carrying the points, may pass down the inclined plane $e$, such bar, by its weight, will move downward, so as to drop the points out of the sole-blank. When the sole-blank receiver is at its lowest position, the step $o$ will be resting on the bracket.

In some cases the sole-receiver and its operative mechanism may be dispensed with, and the sole-blanks be applied by hand directly to the points of the movable die while it may be in its advanced position.

Having thus explained my said machine, what I claim therein as of my invention is as follows:

1. The combination of the two sole-molding dies having mechanism for operating the movable one of them, as set forth, relatively to the stationary one, with the series of points and their carrier applied to the movable die and its carrier, and with the inclined plane affixed to the supporting-frame of the die-carrier, all being to operate substantially as specified.

2. The combination of the sole-molding dies having mechanism for operating the movable one, as described, with the clearer or sole-discharger extending down from the upper die, and with the series of points, their carrier, and its operative inclined plane, all being adapted and arranged substantially as explained.

3. The combination of the sole-blank receiver having mechanism for operating it, as explained, with the two molding-dies having mechanism for actuating one of them, as specified, and with the series of points, their carrier, and its operative inclined plane, all being adapted and arranged substantially as set forth.

4. The combination of the sole-blank receiver having mechanism for operating it, as explained, with the two molding-dies having mechanism for actuating one of them, as described, and with the stationary clearer or sole-discharger, and the series of points, their carrier, and its operative inclined plane, all being adapted and arranged essentially as set forth.

JOSEPH B. JOHNSON.

Witnesses:
JACOB M. LEWIS,
MARY M. OLIVER.